March 23, 1965 A. R. HILTON, JR., ETAL Re. 25,747

SAND CONSOLIDATION

Original Filed Aug. 22, 1960

*INVENTORS.*

ALBERT R. HILTON JR.,
HORACE H. SPAIN

BY John B Davidson

ATTORNEY.

United States Patent Office

Re. 25,747
Reissued Mar. 23, 1965

25,747
SAND CONSOLIDATION

Albert R. Hilton, Jr., Dallas County, and Horace H. Spain, Harris County, Tex., assignors, by mesne assignments, to Jersey Production Research Company, Tulsa, Okla., a corporation of Delaware Original No. 3,100,527, dated Aug. 13, 1963, Ser. No. 51,033, Aug. 22, 1960. Application for reissue May 25, 1964, Ser. No. 380,734
9 Claims. (Cl. 166—33)

Figure 1:
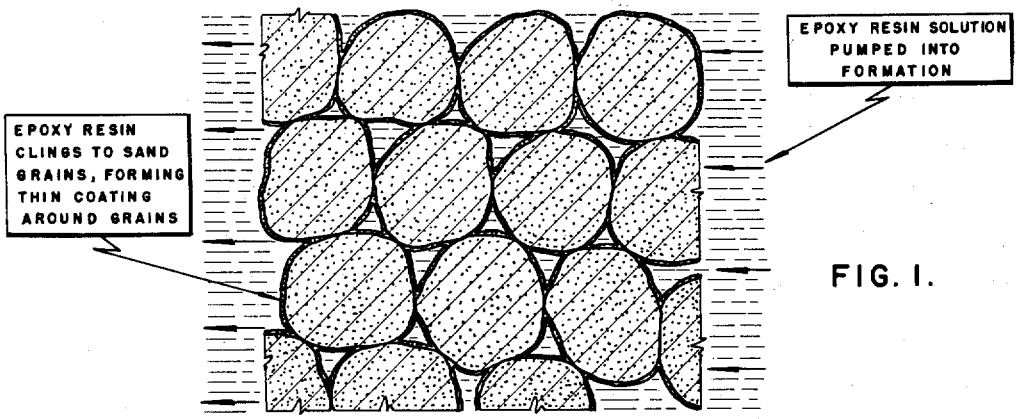

Matter enclosed in heavy brackets [ ] appears in the original patent but forms no part of this reissue specification; matter printed in italics indicates the additions made by reissue.

This invention relates to the treatment of wells, such as hydrocarbon productive wells, wherein the fluid producing formation is an unconsolidated or poorly consolidated sand or where difficulty has been experienced in keeping sand in place in fractures produced in a hydrocarbon productive formation for the purpose of stimulating the productivity of the well. More specifically, the invention relates to techniques for consolidating sand particles in hydrocarbon productive formation wherein a resinous liquid is used for the purpose of binding loose sand particles firmly together.

The use of liquid resinous materials for the purpose of sand consolidation in oil and gas wells has been practiced for a number of years. While success has been achieved with sand consolidation in some wells, complete failure has resulted in other wells. For the most part, the failures has been either in not obtaining consolidation of the sand or in too greatly lowering the permeability of the formation. The most costly type of failure results when there is too great a reduction in permeability, inasmuch as expensive techniques are required to restore permeability to the formation. In general, it can be said that it is desired to coat sand grains with a layer of resin sufficiently thick to bind the sand grains rigidly together, but thin enough to not appreciably reduce the size of pore spaces between sand grains so that there may be sufficient permeability for production purposes. Techniques that have been used in the past usually have either failed to produce the desired consolidation or have reduced the permeability of the sand to an unsatisfactory low value.

In accordance with the teachings of the present invention, sand consolidation is effected by contacting the sand with a solution comprising a thermosetting resin, preferably epoxy resin, in a solvent containing at least some aromatics. This first solution is then forced further back into the earth formation with a second solution comprising a hardener for the epoxy resin in a solvent that is free of olefins and aromatic hydrocarbons. The first and second solutions must be immiscible, and the first solution must be at least partially miscible with both oil and water. It will be found that the epoxy resin solution will form a film around each of the sand grains contacted thereby, and that the epoxy resin solution will extract hardener from the second solution to accelerate the hardening of the resin. The immiscible fluid then may be flushed out of the sand by producing the formation.

Where it is desired that the second solution be of low viscosity relative to the viscosity of the first solution, it is preferred that the main body of the second solution containing the hardener for the epoxy resin be preceded by a bank of hardener solution that has a viscosity of substantially the viscosity of the first solution. It has been found that when this technique is followed, viscous fingering is minimized when the sand particles to be consolidated are of various sizes and shapes, and that viscous fingering is virtually eliminated when the sand grains are fairly large and uniform as is the case for fracturing sand.

Figure 2:
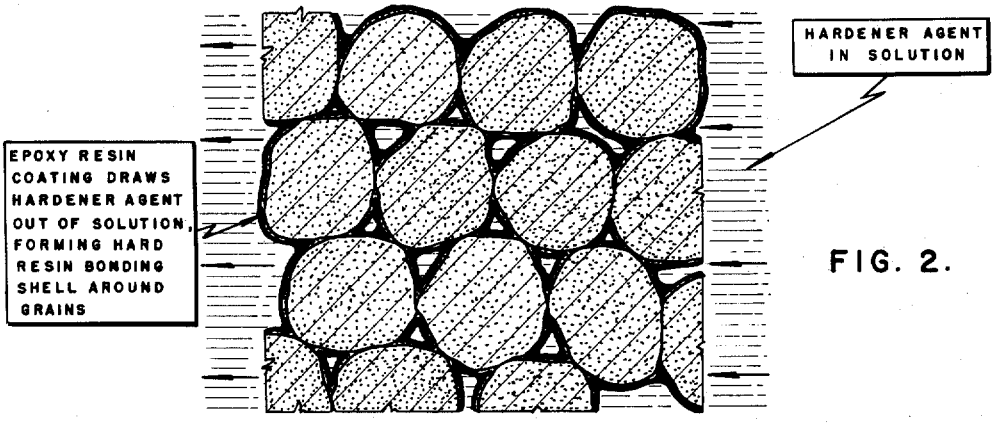
Figure 3:
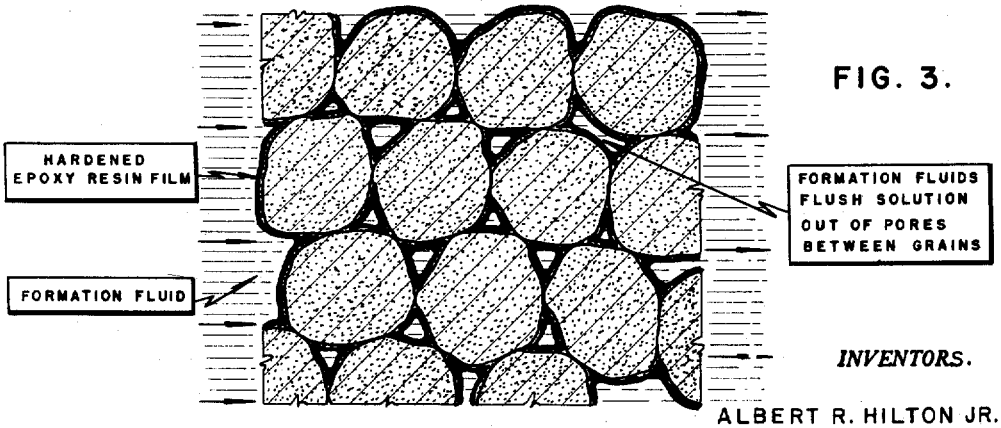

The objects and features of the invention will become more apparent upon consideration of the following description when taken in connection with the accompanying drawings, wherein:

FIGS. 1, 2, and 3 are enlarged representations of sand grains in an earth formation illustrating the effects of the various steps followed in the practice of the invention.

The present invention makes use of thermosetting resins such as epoxy type resins. Epoxy resins are preferred in the practice of the invention, because it has been found that they provide excellent compressive strength, have high adhesion to sand, and require less resin for satisfactory results than other types of thermosetting resins. In particular, it has been found that sand particles are preferentially epoxy wet, i.e., the surfaces of sand particles tend to coat with epoxy resin in preference to water, crude oil, or other connate fluids in hydrocarbon containing earth formations. The epoxy resins are diglycidal ethers of bisphenol A obtained by reaction between epichlorohydrin and bisphenol A using carefully controlled additions of caustic soda to control the pH neutralizing the hydrochloric acid formed in the reaction. The pH is maintained just below the end point of phenolphthalein, about 8 to 8.5. The epoxy resins suitable for use with the invention have at least two reactive epoxy groups in their molecule and are represented by the formula:

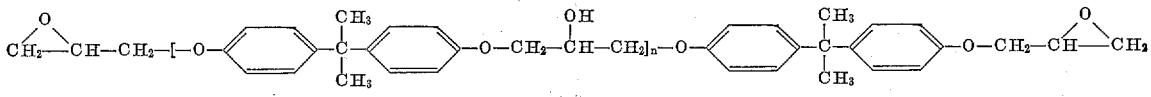

where n is an integer having a value of 1 or a greater number.

Also used in connection with the invention are curing agents, known as hardeners or accelerators, for the thermosetting resin. The hardeners or accelerators have the property of catalyzing the hardening reaction of the thermosetting resin at low temperatures. The preferred epoxy resins may be cured or hardened in the following manner: (1) direct linkage between the epoxy groups by the use of tertiary amines of the general formula $R_3N$; (2) linkage of the epoxide groups with aryl or alkyl hydroxyls such as alcohols (ROH), with alcohols and tertiary amines ($ROH+R_3N$), or with di- or tri-hydric phenols ($Ar(OH)_2$ or $Ar(OH)_3$); and (3) across linkage with curing agents such as polyfunctional primary or secondary amines (ROH) ($NH_2$) or $(ROH)_2(NH)$, with dibasic acids or anhydrides, $R(COOH)_2$ or $Ar(COOH)_2$, with polyfunctional phenols plus curing agent $$(Ar(OH)_2+\text{amine})$$

In the sense used here, R indicates an alkyl group and Ar is the aryl group.

There are many amines, dibasic acids, and acid anhydrides that will serve as curing agents. Diethylene triamine, diethylamino propylamine, ethylene diamine, triethylene triamine, tridimethyl amino methyl phenol (DMP-30, made by Rohm and Haas and the preferred catalyst for use with the present invention), benzyldimethylamine, metaphenylenediamine, and 4,4-methylene diamiline, are typical of the amine curing agents for epoxy resins. The acid anhydrides suitable for this purpose are illustrated by oxalic, phthalic, pyromellitic dianhydride and dodecenyl succinic anhydride.

In the practice of the invention the thermosetting resin is dissolved in a solvent that can also dissolve a substantial amount of water but still have a favorable partition coefficient so that the resin can (when not in solution) extract curing agent from the curing agent solution to be described below. For reasons that will become apparent below, it is desirable that the viscosity of the epoxy resin solution be at least 3 centipoises at the temperature of the formation into which it is to be injected in the manner described below. Preferably, the viscosity is in the range from 5 to 25 centipoises at the formation temperature. The viscosity can be adjusted by varying the amount of one of the constituents of the low viscosity solvent.

The preferred solvent for the epoxy resin is ethyl alcohol denatured with methyl alcohol and kerosene in the range from 60 to 90 percent by volume of alcohol to 40 to 10 percent kerosene. The kerosene must contain some aromatic hydrocarbons to give a clear homogeneous solution suitable for use. Other oils that may be used are diesel oil and white oil to which some aromatic hydrocarbons such as toluene have been added. Suitable solvents, other than ethyl alcohol, are acetone or methyl-ethyl ketone.

The epoxy resin is dissolved in the range of between 50 to 100 percent by volume of epoxy resin in the solvent. A preferred range is 60 to 90 percent by volume of epoxy resin in the solvent.

By the term "partition coefficient," as used above, is meant the ratio of the concentration of hardener in the resin phase to the concentration of hardener in the oil phase at equilibrium.

As mentioned above, the hardener or accelerator to be used with the resin is dissolved in a solvent to form a second solution that is immiscible with the first solution. The second solution must be free of aromatic and olefin hydrocarbons and, as indicated above, must offer a satisfactory partition coefficient for the hardener or accelerator so that the hardener may be extracted therefrom by the thermosetting resin. A preferred solvent for the hardener or accelerator is an acid treated kerosene, diesel oil or a white oil. White oils are specially treated, refined petroleum oils that contain no unsaturated or aromatic hydrocarbons. In order to minimize viscous fingering of the second solution into the sand containing the first solution, the second solution should have a viscosity substantially equal to or somewhat greater than the viscosity of the first solution.

The preferred ratio of hardener to solvent varies with the temperature of the earth formation and the type of hardener used. A preferred ratio that has been found to be particularly effective is 2½ parts by volume of tridimethyl amino methyl phenol to 100 parts by volume of white oil.

In the practice of the invention, the epoxy resin solution is pumped down a tubing string to the level of the incompetent formation to be consolidated, and liquids previously in the tubing string are forced up the annulus around the tubing string. A packer above the level of the formation may then be set between the tubing and casing in order to isolate the lower end of the tubing string so that pressure may be applied to force the epoxy resin solution into the formation. The epoxy resin solution is immediately followed by the hardener solution, and the hardener solution is pumped into the formation to displace the epoxy resin solution further back into the formation. As indicated above, for the purpose of reducing or eliminating viscous fingering, the main bank of the hardener solution may be preceded by a bank of hardener solution having substantially the same viscosity as the epoxy resin solution. This initial portion of the hardener solution and the main bank of hardener will diffuse together as they are pumped down the pipe string and into the formation so that there will be no sharp liquid interface where the viscosity changes suddenly. When the sand particles have been contacted both by the epoxy resin solution and the hardener solution to a desired distance away from the well bore, pumping is stopped and both of the solutions are allowed to remain in the formation, preferably for a period of between one and 72 hours. The formation may then be produced in order to flush the remainder of both of the solutions out of the formation and up the production pipe string.

Referring now to FIG. 1, there is shown the situation that will prevail in the formation when the epoxy resin solution is being pumped thereinto. As the epoxy resin solution enters the formation, it will displace the connate oil and water and wet surfaces of the sand grains. The reason that this happens is that first, the sand grains are preferentially epoxy wet and second, that the connate oil and water in the formation will be displaced by the epoxy resin solution inasmuch as the solution is at least partially miscible with both oil and water, so that the epoxy resin will be able to contact the surfaces of the sand grains with ease. The capillary spaces between the sand grains will be filled with the epoxy resin solution in solution with the connate fluids. In FIG. 2 there is shown the situation that will prevail in the formation when the hardener solution is pumped thereinto. The hardener solution, being immiscible with the epoxy resin solution, will force the epoxy resin solution further back into the formation and will displace the epoxy resin solution in the zones that have been previously contacted by the epoxy resin solution. However, the epoxy resin solution that has coated the surfaces of the sand grains will not be forced back into the formation by the hardener solution. Instead, as the hardener solution invades regions wherein the sand grains have been coated by the epoxy resin solution, a portion of the hardener or accelerator in the second solution will be extracted from the second solution by the epoxy resin solution to accelerate the hardening of the epoxy resin coating the surfaces of the sand grains. It will be noted that the epoxy resin coating the surfaces of the sand grains in effect will cement together portions of the surfaces of the individual sand grains to form a consolidated mass. However, the capillary spaces between the sand grains will remain open inasmuch as the epoxy resin coating is quite thin when the epoxy resin solutions has the viscosities set forth above.

In FIG. 3 is shown the situation that will prevail when the formation is being produced. The epoxy resin solution and the hardener solution remaining in the formation will be flushed out by the formation fluids. The hardened epoxy resin films on the sand grains will remain and will be unaffected by the formation fluids. The pore or capillary spaces between the sand grains will permit fluid flow through the unconsolidated sand mass and will hold back the unconsolidated sand that has not been contacted as described above.

It is preferable that the sands in the unconsolidated formation be contacted both by the epoxy resin solution and by the hardener or accelerator solution for a distance of between 1 to 3 feet around the borehole. It will be found that this distance is satisfactory to withstand the tremendous forces imposed thereon by the formation fluids migrating towards a well bore.

The invention also can be utilized for the purpose of consolidating sand particles that have been injected into fractures produced in earth formations for the purpose of stimulating production therefrom. Such fractures may be produced by explosive or hydraulic techniques such as are well known to the art. The fracture produced in the formation normally is held open by large grains of sand of substantially uniform dimensions that are placed in the fracture with hydraulic fluid or by other means. This so-called frac-sand often will flow back into the well bore and impede pumping operations. After a formation has been fractured and sand has been placed in the fractures, the sand may be treated with the resin coating solution and hardener containing solution in the manner described above to consolidate the sand particles in the fractures and to cement them to the earth formation. The viscosity of the epoxy resin solution must be at least 8 centipoises at the temperature of the formation into which the solutions are to be injected.

The following examples illustrate laboratory experiments wherein formation conditions were simulated to study the effectiveness of the invention.

EXAMPLE I

A sand tube one inch in diameter by six inches long was packed with an oil field sand having grains of irregular size and shape, and the sand was saturated to simulate an oil said containing connate water. The sand was treated with a 60 percent by volume solution of Epon 815 (a commercial epoxy resin made by the Shell Oil Company) in a solvent containing 75 percent by volume of ethanol denatured with methanol and 25 percent kerosene containing some aromatics. The resin solution was then displaced with a solution of white oil containing 2.5 percent of tridimethyl amino methyl phenol. The epoxy resin solution had a viscosity of about 25 centipoises at 80° F., and the second solution had a viscosity between 25 and 30 centipoises at 80° F. After time was allowed for the resin to harden, the second solution was flushed out. The sand was found to be firmly consolidated.

EXAMPLE II

A plurality of one inch by 6 inch plastic tubes were packed with a dry oil field sand. The sand in each tube was wet with a 5 percent NaCl solution, and then swept with diesel oil. The tubes were placed in a constant temperature bath. The tubes were then treated by flowing therethrough solutions having varying amounts of epoxy resin, (between 40 to 100 percent) in a solvent consisting essentially of 75 percent by volume of anhydrous ethyl alcohol denatured with methyl alcohol and 25 percent by volume of kerosene containing at least some aromatics. A one percent volume solution of tridimethyl amino methyl phenol (DMP–30) in white oil having substantially the same viscosity as the epoxy resin solution, and a one percent volume solution of tridimethyl amino methyl phenol (DMP–30) in dearomatized and deolefinized kerosene were prepared. The sand in each of the tubes was contacted with a small amount of the white oil solution preceding a much larger amount of the kerosene solution. In each case, the sand was found to be firmly consolidated. The sand in a tube treated as described above with the epoxy resin solution, one liter of white oil hardener solution, and 10 liters of kerosene-hardener solution, which treatment was carried out at 140° F., had a compressive strength of 1210 p.s.i. in 3 hours. The sand in a tube treated in a similar manner at 100° F. had a compressive strength of 2300 p.s.i. in 2 hours.

EXAMPLE III

An experiment similar to Example II was carried out except that the epoxy resin was diluted with diglycidal ether rather than with the special alcohol-kerosene solvent. It was noted that the sand was wetted much better with the alcohol-kerosene diluted resin than with the diglycidal ether-diluted resin. The wetting was visible as a deep color change in the column. The sand contacted by the diglycidal ether-diluted resin and then contacted by the hardener solutions in the manner described in Example II had a compressive strength of 640 p.s.i.

The following examples illustrate field techniques used to evaluate the invention.

EXAMPLE IV

Attempts to produce a 7-foot productive interval in the Miocene sand in a particular well in the South Thompson field of the Texas Gulf Coast had resulted in the well sanding up. The interval of the sand was treated with 48 gallons of a solvent containing 60 percent epoxy resin in a solvent of 75 percent denatured ethyl alcohol and 25 percent kerosene. This solution was followed immediately by 27 gallons of white oil 75 and then with 27 gallons of white oil containing 1.75 percent of DMP–30, followed by 220 gallons of WS–3750 containing 1.75 percent of DMP–30. The well was allowed to remain shut in for 24 hours, after which production was started. The well was produced at a rate of 100 barrels per day to clean out the fluids and the water lost during workover. Thereafter the well was produced at its allowable rate of 17 barrels per day with no trace of sand in the fluid.

EXAMPLE V

A well in the Racoon Bend field of the Texas Gulf Coast had 14 feet of perforations at the 2000-foot depth. The treatment given this well was identical with the treatment described in Example IV except that twice as much materials were used. On a swabbing test, the well produced 96 barrels per day with no trace of sand detectable. The treatment is considered a success on the basis of this test.

The invention is not necessarily to be restricted to the specific examples, methods, structural details, or arrangement of parts herein set forth, as various modifications may be effected without departing from the spirit and scope of the invention.

The objects and features of the invention having been completely set forth, what it is desired to claim is:

1. A method of consolidating loose or unconsolidated sand particles in an earth formation penetrated by a borehole, comprising:

pumping through the borehole into the earth formation a first solution having a viscosity greater than 3 centipoises and comprising a biphenol "A" type epoxy resin in a solvent therefor in the range of 50 to 100 percent by volume of epoxy resin, said solvent comprising between 60 to 90 percent by volume of denatured ethyl alcohol and between 40 and 10 percent by volume of kerosene containing aromatic hydrocarbons sufficient in amount to give a clear homogeneous solution;

[displacing said first solution with a second solution] *forcing said first solution further into the formation with a liquid* immiscible with said first solution [and] *so that epoxy resin in the first solution remains on the surfaces of sand particles in the formation, said liquid including a second solution* comprising a hardening and curing agent for said epoxy resin in an aromatic-free and olefin-free aliphatic hydrocarbon solvent, at least the portion of said [second solution] *liquid* in contact with said first solution being of substantially equal or greater viscosity than said first solution;

the percentage of resin in said solvent therefore being sufficient to permit the resin to extract hardening nad curing agent from said second solution;

leaving said second solution in said earth formation for an interval sufficient for the portion of said epoxy resin adhering to the sand particles to extract at least a portion of said hardening and curing agent from said second solution, and to harden; and producing connate earth fluids from said earth formation to remove the liquid portions of said first and second solutions remaining therein.

2. A method of consolidating loose or unconsolidated sand particles in an earth formation penetrated by a borehole, comprising:

pumping [through the borehole] into the earth formation a first solution having a viscosity greater than 3 centipoises and comprising a thermosetting resin in a solvent therefor that is at least partially miscible with both crude oil and water;

[displacing said first solution with a second solution] *forcing said first solution further into the formation with a liquid* immiscible with said first solution [and] *so that thermosetting resin in the first solution remains on the surfaces of sand particles in the for-*

*mation, said liquid including a second solution* comprising a hardening and curing agent for said thermosetting resin in an aromatic-free and olefin-free hydrocarbon solvent therefor, at least the portion of said [second solution] *liquid* in contact with said first solution being of substantially equal or greater viscosity than the viscosity of said first solution;

the concentration of resin being between 50 to 100 percent by volume of resin such that the partition coefficient [of] *between* said first solution *and said second solution* permits extraction of hardening and curing agent from said second solution;

leaving said second solution in said earth formation for a time interval sufficient for the thermosetting resin adhereing to sand particles to extract said hardening and curing agent from said second solution, and to harden; and producing connate fluids from said earth formation to remove the remaining liquid portions of said first and second solutions.

3. A method of consolidating loose or unconsolidated sand particles in an earth formation penetrated by a borehole, comprising:

pumping [through the borehole] into the earth formation a first solution having a viscosity greater than 3 centipoises and comprising a thermosetting resin in a solvent therefor that is at least partially miscible with both crude oil and water;

[displacing said first solution with a second solution] *forcing said first solution further into the formation with a liquid* immiscible with said first solution [and] *so that thermosetting resin in the first solution remains on the surfaces of sand particles in the formation, said liquid including a second solution* comprising a hardening and curing agent for said thermosetting resin in an aromatic-free and olefin-free hydrocarbon solvent therefor, at least the portion of said [second solution] *liquid* in contact with said first solution being of substantially equal or greater viscosity than the viscosity of said first solution;

the concentration of resin being between 50 to 100 percent by volume such that the partition coefficient [of] *between* said first solution *and said second solution* permits extraction of hardening and curing agent from said second solution;

leaving said second solution in said earth formation for a time interval of between 1 and 72 hours to permit resin adhering to sand particles to extract hardening and curing agent from said second solution, and to harden; and producing earth fluids from said earth formations to remove the remaining liquid portions of said first and second solutions.

4. A method of consolidating loose or unconsolidated *sand* particles in an earth formation penetrated by a borehole, comprising:

pumping [through the borehole] into the earth formation a first solution having a viscosity greater than 3 centipoises and comprising an epoxy resin in a solvent therefor that is at least partially miscible with both crude oil and water;

[displacing said first solution with a second solution] *forcing said first solution further into the formation with a liquid* immiscible with said first solution [and] *so that epoxy resin in the first solution remains on the surfaces of sand particles in the formation, said liquid including a second solution* comprising a hardening and curing agent for said epoxy resin in an aromatic-free and olefin-free hydrocarbon solvent therefor, at least the portion of said [second solution] *liquid* in contact with said first solution being of substantially equal or greater viscosity than the viscosity of said first solution;

the concentration of resin being such that the partition coefficient [of] *between* said first solution *and said second solution* permits extraction of hardening and curing agent from said second solution;

leaving said second solution in said unconsolidated sand for an interval of sufficient time duration to permit the epoxy resin adhering to sand particles to extract hardening and curing agent from said second solution, and to harden; and producing connate earth fluids from said earth formation to remove the remaining liquid portions of said first and second solutions.

5. A method of consolidating loose or unconsolidated sand particles in an earth formation penetrated by a borehole, comprising:

pumping [through the borehole] into the earth formation a first solution having a viscosity greater than 3 centipoises and comprising an epoxy resin in a solvent therefor that is at least partially miscible with both crude oil and water;

[displacing said first solution with a second solution] *forcing said first solution further into the formation with a liquid* immiscible with said first solution [and] *so that epoxy resin in the first solution remains on the surfaces of sand particles in the formation, said liquid including a second solution* comprising a hardening and curing agent for said epoxy resin in an aromatic-free and olefin-free solvent therefor, at least the portion of said [second solution] *liquid* in contact with said first solution being of substantially equal or greater viscosity than the viscosity of said first solution;

the concentration of resin in the solvent being sufficient to adjust the partition coefficient [of] *between* said first solution *and said second solution* to a value that permits extraction of hardening and curing agent from said second solution;

leaving said second solution in said unconsolidated sand for an interval of between 1 and 72 hours to permit the epoxy resin adhering to said particles to extract hardening and curing agent from said second solution, and to harden; and producing earth fluids from said earth formation to remove the remaining liquid portions of said first and second solutions.

*6. A method of consolidating loose or unconsolidated sand particles in an earth formation penetrated by a borehole, comprising:*

*forcing into the earth formation a first solution having a viscosity greater than 3 centipoises and comprising an epoxy resin in a solvent therefor that is at least partially miscible with both crude oil and water;*

*forcing said first solution further into the formation with a liquid so that epoxy resin in the first solution remains on the surfaces of the sand particles in the formation, said liquid being immiscible with said first solution and including a second solution of hardening and curing agent for said epoxy resin in an aromatic-free and olefin-free hydrocarbon solvent therefor, at least the portion of said liquid in contact with said first solution being of substantially equal or greater viscosity than the viscosity of said first solution;*

*the concentration of resin in said first solution being such that the partition coefficient between said first solution and said second solution permits extraction of said hardening and curing agent from said second solution;*

*leaving said second solution in said unconsolidated sand for an interval of sufficient time duration to permit the epoxy resin adhering to said sand particles to extract said hardening and curing agent from said second solution, and to harden, and*

*producing connate earth fluids from said earth formation to remove the remaining liquid portions of said first and second solutions.*

*7. A method of consolidating loose or unconsolidated sand particles in an earth formation penetrated by a borehole, comprising:*

*forcing into the earth formation a first solution having a viscosity greater than 3 centipoises and comprising a thermosetting resin in a solvent therefor that is at least partially miscible with both crude oil and water;*

*forcing said first solution further into the formation with a liquid so that thermosetting resin in the first solution remains on the surfaces of the sand particles in the formation, said liquid being immiscible with said first solution, and including a second solution of hardening and curing agent for said thermosetting resin in an aromatic-free and olefin-free hydrocarbon solvent therefor, at least the portion of said liquid in contact with said first solution being of substantially equal or greater viscosity than the viscosity of said first solution;*

*the concentration of resin being between 50 and 100 percent by volume such that the partition coefficient between said first solution and said second solution permits extraction of hardening and curing agent from said second solution;*

*leaving said second solution in said earth formation for a time interval sufficient for the thermosetting resin adhering to sand particles to extract said hardening and curing agent from said second solution, and to harden; and*

*producing connate earth fluids from said earth formation to remove the remaining liquid portions of said first and second solutions.*

*8. A method of consolidating loose or unconsolidated sand particles in an earth formation penetrated by a borehole, comprising:*

*introducing into the earth formation a first solution having a viscosity greater than 3 centipoises and comprising an epoxy resin in a solvent therefor that is at least partially miscible with both crude oil and water;*

*forcing said first solution further into the formation with a liquid so that epoxy resin in the first solution remains on the surfaces of the sand particles in the formation, said liquid being immiscible with said first solution and including a second solution of hardening and curing agent for said epoxy resin in an aromatic-free and olefin-free hydrocarbon solvent therefor, at least the portion of said liquid in contact with said first solution being of substantially equal or greater viscosity than the viscosity of said first solution;*

*the concentration of resin in said first solution being such that the partition coefficient between said first solution and said second solution permits extraction of said hardening and curing agent from said second solution;*

*leaving said second solution in said unconsolidated sand for an interval of sufficient time duration to permit the epoxy resin adhering to said sand particles to extract said hardening and curing agent from said second solution, and to harden; and*

*producing connate earth fluids from said earth formation to remove the remaining liquid portions of said first and second solutions.*

*9. A method of consolidating loose or unconsolidated sand particles in an earth formation penetrated by a borehole, comprising:*

*introducing into the earth formation a first solution having a viscosity greater than 3 centipoises and comprising a thermosetting resin in a solvent therefor that is at least partially miscible with both crude oil and water;*

*forcing said first solution further into the formation with a liquid so that thermosetting resin in the first solution remains on the surfaces of the sand particles in the formation, said liquid being immiscible with said first solution, and including a second solution of hardening and curing agent for said thermosetting resin in an aromatic-free and olefin-free hydrocarbon solvent therefor, at least the portion of said liquid in contact with said first solution being of substantially equal or greater viscosity than the viscosity of said first solution;*

*the concentration of resin being between 50 and 100 percent by volume such that the partition coefficient between said first solution and said second solution permits extraction of hardening and curing agent from said second solution;*

*leaving said second solution in said earth formation for a time interval sufficient for the thermosetting resin adhering to sand particles to extract said hardening and curing agent from said second solution, and to harden; and*

*producing connate earth fluids from said earth formation to remove the remaining liquid portions of said first and second solutions.*

References Cited by the Examiner

The following references, cited by the Examiner, are of record in the patented file of this patent or the original patent.

UNITED STATES PATENTS

| | | | |
|---|---|---|---|
| 2,378,817 | 6/45 | Wrightsman et al. | 166—33 |
| 2,670,048 | 2/54 | Menaul | 166—33 |
| 2,674,322 | 4/54 | Cardwell | 166—33 |
| 2,823,753 | 2/58 | Henderson et al. | 166—33 |

CHARLES E. O'CONNELL, *Primary Examiner.*